United States Patent
Beier et al.

(10) Patent No.: US 8,151,837 B2
(45) Date of Patent: Apr. 10, 2012

(54) FUEL FILLER CLOSURE DEVICE FOR AUTOMOTIVE VEHICLE

(75) Inventors: Robert Joseph Beier, Plymouth, MI (US); Brian Thomas Aitken, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 1261 days.

(21) Appl. No.: 11/845,266

(22) Filed: Aug. 27, 2007

(65) Prior Publication Data
US 2009/0056830 A1 Mar. 5, 2009

(51) Int. Cl.
*B65B 1/04* (2006.01)

(52) U.S. Cl. ........................ 141/350; 220/86.2

(58) Field of Classification Search .................. 141/350; 220/86.2
See application file for complete search history.

(56) References Cited

U.S. PATENT DOCUMENTS

| | | | |
|---|---|---|---|
| 4,573,694 A | 3/1986 | Goto et al. | |
| 5,145,081 A * | 9/1992 | Gravino | 220/86.2 |
| 5,405,040 A | 4/1995 | Keller | |
| 5,435,358 A * | 7/1995 | Kempka et al. | 141/312 |
| 5,485,871 A * | 1/1996 | Romanek et al. | 141/312 |
| 5,525,977 A * | 6/1996 | Suman | 340/4.4 |
| 5,732,842 A * | 3/1998 | Krause et al. | 220/254.1 |
| 5,944,075 A | 8/1999 | Turner et al. | |
| 5,988,238 A * | 11/1999 | Palvolgyi | 141/312 |
| 6,279,626 B1 * | 8/2001 | Schmitt et al. | 141/348 |
| 6,446,826 B1 | 9/2002 | Foltz et al. | |
| 6,722,407 B2 | 4/2004 | Henry | |
| 6,755,057 B2 | 6/2004 | Foltz | |
| 6,968,874 B1 | 11/2005 | Gabbey et al. | |
| 6,994,130 B1 * | 2/2006 | Gabbey et al. | 141/371 |
| 7,059,365 B2 | 6/2006 | O'Connell | |
| 7,077,178 B2 | 7/2006 | Hedevang | |
| 7,082,973 B2 | 8/2006 | Ganachaud et al. | |
| 7,170,400 B2 * | 1/2007 | Cowelchuk et al. | 340/438 |
| 2004/0069782 A1 | 4/2004 | Miura et al. | |
| 2006/0169356 A1 | 8/2006 | Ganachaud et al. | |

FOREIGN PATENT DOCUMENTS

| | | |
|---|---|---|
| EP | 1415844 A2 | 5/2004 |
| WO | WO2005/025914 A1 | 3/2005 |

\* cited by examiner

*Primary Examiner* — Timothy L Maust
(74) *Attorney, Agent, or Firm* — Jerome R. Drouillard; Greg P. Brown

(57) ABSTRACT

A fuel filler closure device for an automotive vehicle includes a valve body adapted for mounting to a fuel filler pipe and having a filler passage. An access door mounted within the valve body has an open position allowing placement of a fuel nozzle within the filler passage and a closed position for blocking insertion of a filler nozzle. The locking mechanism selectively permits the access door to move from the closed position to the open position. The locking mechanism may include either a manual locking device, or an electronic or other type of remote lock which will be responsive to a vehicle condition.

5 Claims, 4 Drawing Sheets

FUEL FILLER CLOSURE DEVICE FOR AUTOMOTIVE VEHICLE

BACKGROUND OF THE INVENTION

1. Field of the Invention

The present invention relates to a fuel filler pipe closure device which dispenses with the need for a separate cap to be removed by a motorist prior to refueling a vehicle.

2. Disclosure Information

Capless fuel filler devices have been used in the automotive business for several years. With typical capless fill systems, the fuel nozzle pushes aside a spring-loaded door as the nozzle is inserted into the filler. This obviates the need for a motorist to open or close a fuel cap in a separate operation. Unfortunately, known capless fuel filler devices suffer from a disadvantage inasmuch as a dead volume existing in the filler device above the sealing door may become contaminated with road splash, dust, or other unwanted material, which may be allowed to fall into the filler pipe when a filler nozzle is inserted.

Another drawback of certain known capless devices resides in their inability to provide locking protection to prevent theft of fuel or tampering with a vehicle.

It would be desirable to provide a capless fuel filler system which minimizes contamination of both the fuel and the capless seal itself, while providing an opportunity to lock the filler device with an integral structure, so as to prevent unauthorized opening of the fill path.

SUMMARY OF THE INVENTION

According to an aspect of the present invention, a fuel filler closure device for an automotive vehicle includes a valve body adapted for mounting to a fuel filler pipe, with the valve body having a filler passage and an access door mounted within the valve body. The access door has an open position allowing placement of a fuel nozzle within the filler passage, and a closed position blocking insertion of a filler nozzle. A locking mechanism selectively permits the access door to move from the closed position to the open position. The access door may be configured as a primary access door cooperating with a sealing system to prevent fuel vapor and liquid from leaving the filler closure device when the access door is in the closed position; alternatively, the duties of the access door may be limited to controlling physical access to a sealed door underlying the access door.

According to another aspect of the present invention, a locking mechanism for the access door may include either a manually lockable plunger, or a pneumatic or electrically lockable remotely controlled plunger which is preferably adapted for locking and unlocking in response to a condition activated by a motorist, or passively activated in response to the proximity of an electronic device such as an electronic key fob.

It is an advantage of a fuel filler closure device according to the present invention that contamination of the fuel system and, ultimately, the fuel contained therein, is mitigated because of the presence of a primary access door mounted within the device's valve body proximate an outer surface of the valve body.

It is a further advantage of a fuel filler closure device according to the present invention that the device, although having a capless operating principle, is nevertheless lockable to prevent unauthorized access to the fuel system.

It is yet another advantage of a fuel filler closure device according to the present invention that locking and unlocking may be accomplished in a passive manner with the use of an electronic key fob or other electronic device.

Other advantages, as well as features of the present invention, will become apparent to the reader of this specification.

DETAILED DESCRIPTION OF THE PREFERRED EMBODIMENTS

Figure 1:
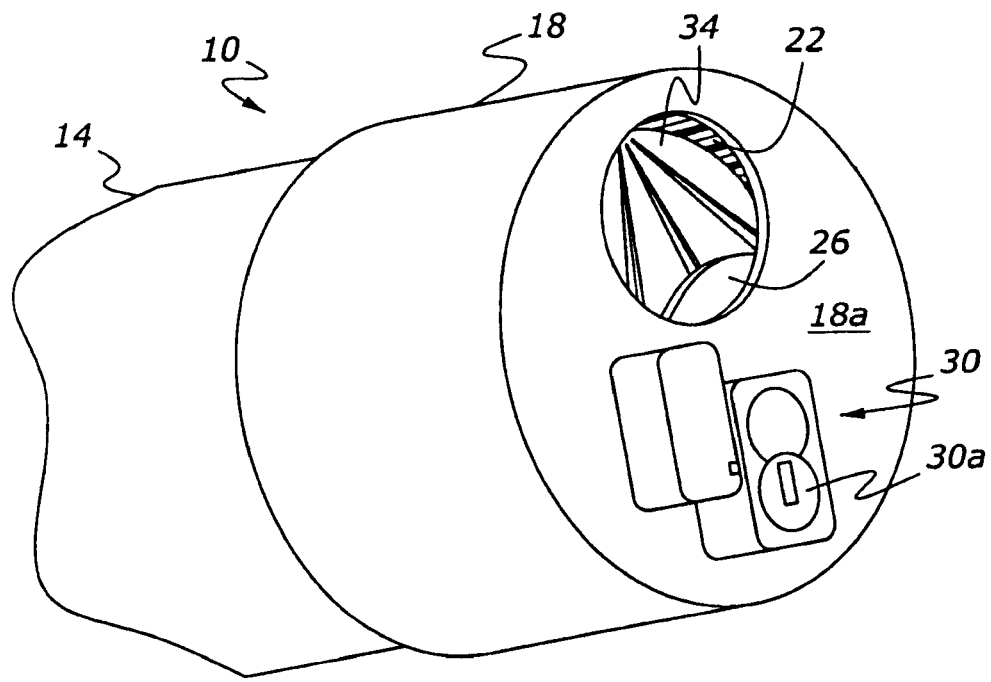
FIG. 1 is a perspective view of a fuel filler pipe having a closure device according to the present invention.
Figure 2:
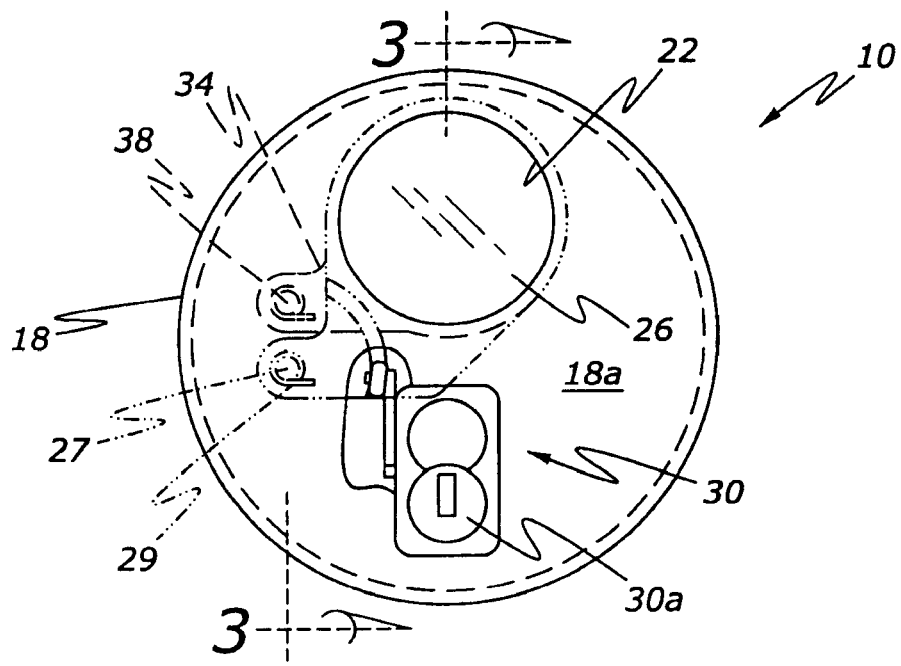
FIG. 2 is a plan view of the outboard surface of the filler pipe closure device shown in FIG. 1, with both a primary access door and an underlying sealed door in closed positions.

As shown in FIG. 1, fuel filler closure device 10 is adapted to be mounted upon a filler pipe, 14, which is adapted for connection to a fuel tank (not shown). Filler closure device 10 has a generally cylindrical valve body 18 with a filler passage 22 formed therein. Primary access door 26 is mounted upon pivot 27 (FIG. 2) proximate the outermost surface, 18a, of valve body 18. Primary access door 26 is biased by a torsion spring, 29, into its open position, it being understood that FIG. 1 shows access door 26 in a partially open position. Lock and plunger assembly 30, contains a key cylinder, 30a, which, when unlocked, allows lock and plunger assembly 30 to move outwardly as ramp portion 32 impinges upon roller 31 (FIG. 3), which is affixed to lock and plunger assembly 30. Thus, when lock and plunger assembly 30 is unlocked and moves outwardly, primary access door 26 is allowed to move to an open position as roller 31 runs along ramp 32.

Figure 3:
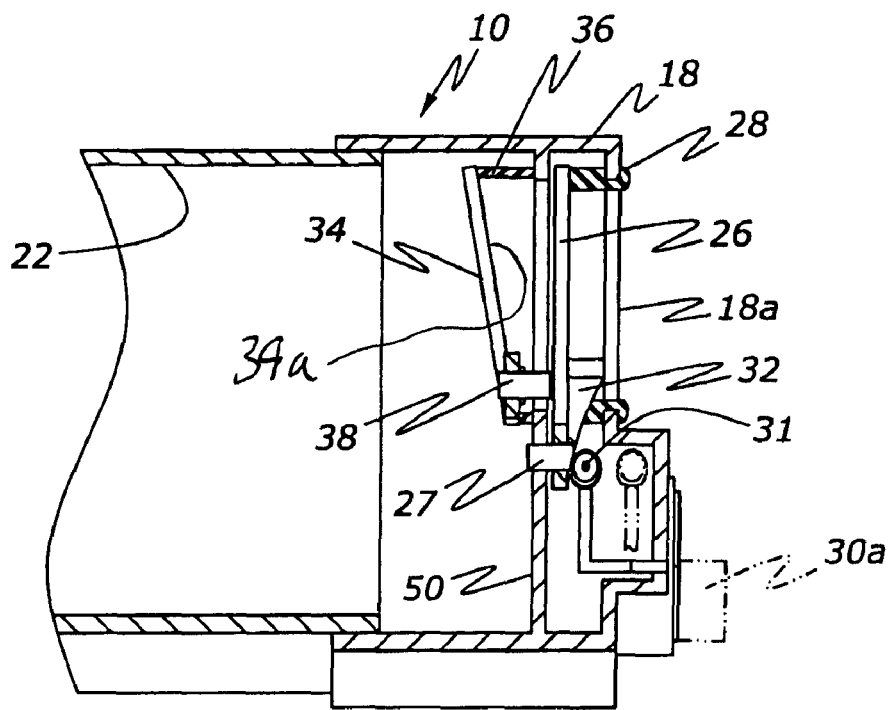
FIG. 3 is a sectional view of the filler pipe and closure device of FIGS. 1 and 2, taken along the line 3-3 of FIG. 2.
Figure 4:
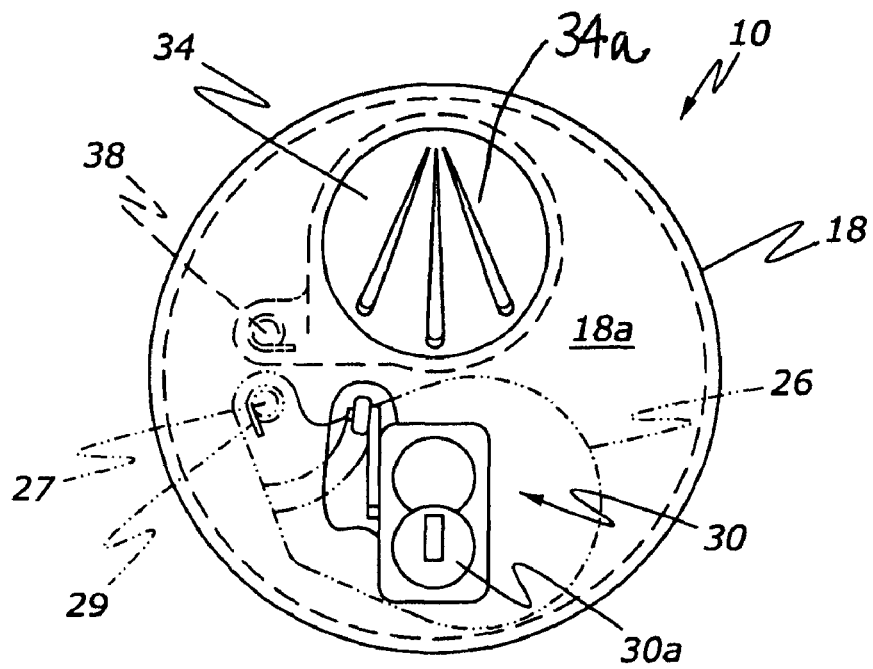
FIG. 4 is similar to FIG. 2, but shows only a primary access door in an open position.
Figure 5:
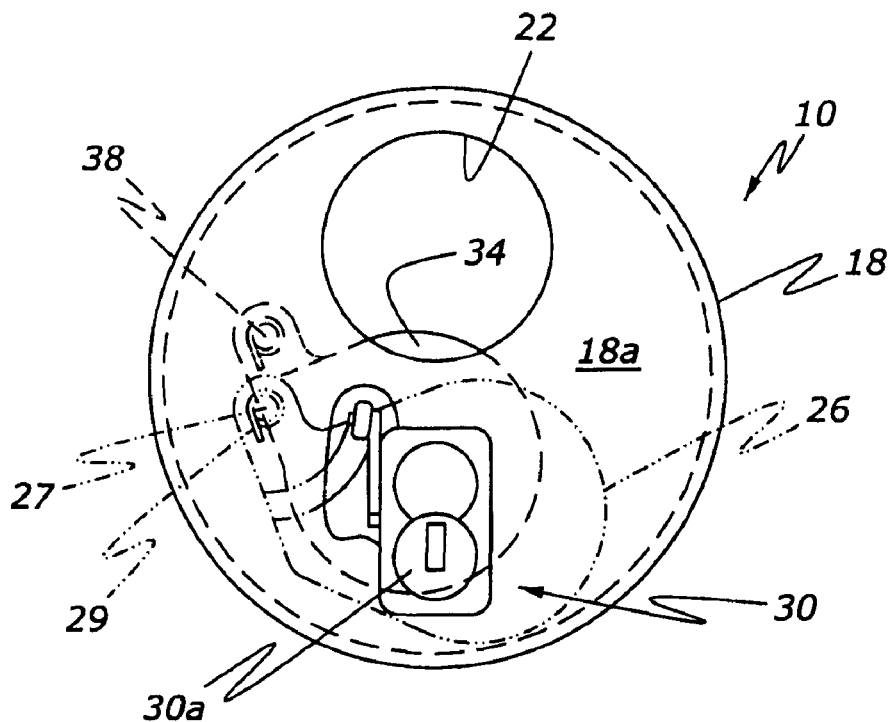
FIG. 5 is similar to FIGS. 2 and 4, but shows both a primary access door and a sealed door in their respective open positions.

Primary access door 26 functions not only to prevent access to underlying sealed door 34, but also performs a sealing function in the event that an annular seal, primary seal 28, as shown in FIG. 3, is incorporated in outer wall 18a of valve body 18. Primary access door 26 may be either used alone, or in combination with a second sealed door, 34, which is shown best in FIGS. 1, 3, and 4. Sealing door 34 is configured such that insertion of a fuel filler nozzle into closure device 10 causes door 34 to move slidably while rotating upon pivot 38, in the same direction as primary access door 26 moves to allow access. FIG. 5 shows both of doors 26 and 34 in their open positions. In essence, sealed door 34 has a ramp, 34a (FIGS. 3 and 4), built into its outermost facing surface, which allows the fuel filler nozzle to push sealed door 34 aside as it is inserted into closure device 10. Door 34 makes sealing contact with annular seal 36, which is carried by bulkhead 50 (FIG. 3). Annular seal 36 serves to cooperate with sealed door 34 to prevent fuel vapor from leaving closure device 10.

Figure 6:
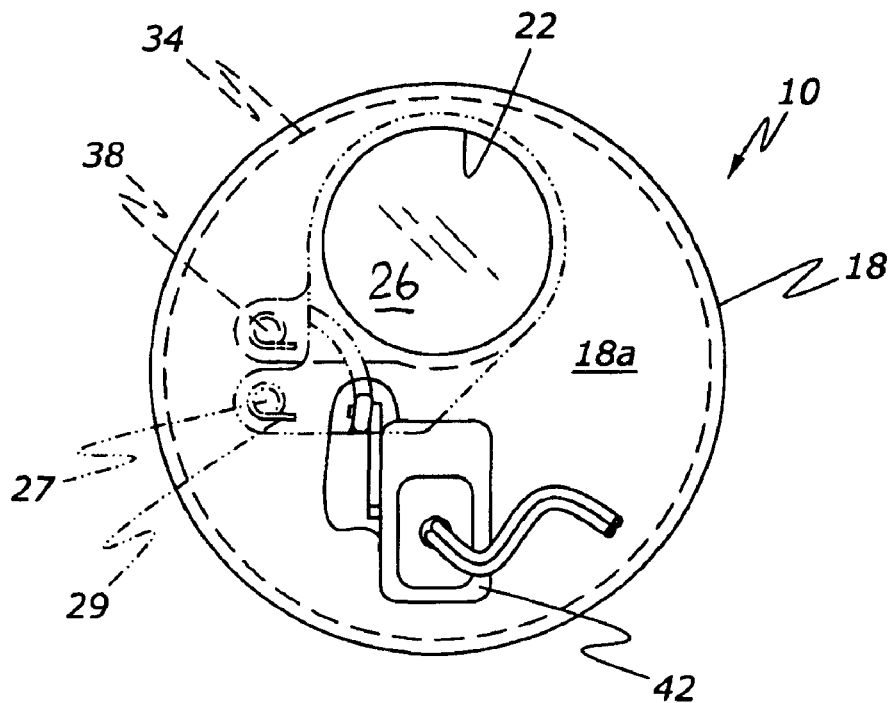
FIG. 6 illustrates a remotely controlled lock for a primary access door according to an aspect of the invention.
Figure 7:
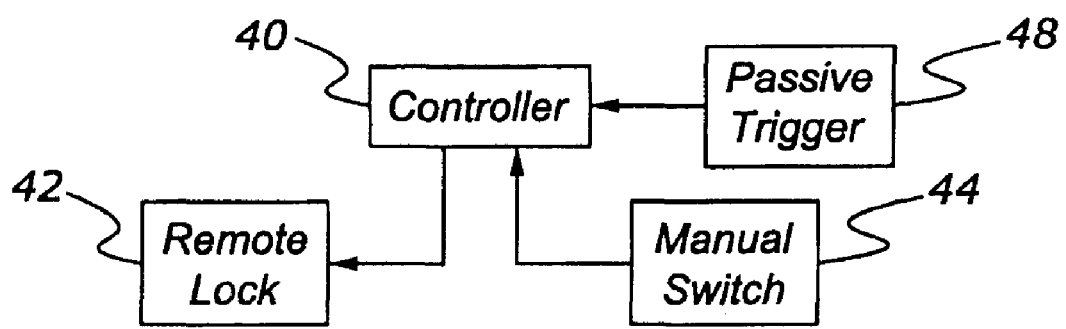
FIG. 7 is a schematic representation of a control device according to an aspect of the present invention.

As an alternative to the manual locking device illustrated in FIGS. 1-5, a remote locking system, shown in FIGS. 6 and 7, may be employed with the present closure device. In general, controller 40 will receive a lock/unlock signal from either a manual switch, 44, or passive trigger 48. If manual switch 44 is employed, a motorist will activate a vehicle condition either by inserting an ignition key, or by operating another manual switch, such as one integrated with an electronic key fob, which will cause remote lock 42 to allow a filler nozzle to be inserted into closure device 10. Those skilled in the art will appreciate in view of this disclosure that remote lock 42 could comprise either an electric solenoid coupled with a push-pull cable, or a pneumatic or hydraulic device, or yet other types of remotely lockable devices known to those skilled in the art and suggested by this disclosure.

In the event that passive trigger 48 is employed as shown in FIG. 7, the passive trigger may be embodied as an electronic device, such as an electronic key fob, using known radio frequency identification technology currently employed with automotive vehicle ignition systems, to direct controller 40 replace remote lock 42 in an unlocked position so as to permit insertion of a fuel filler nozzle into closure device 10. Passive triggering of unlocking could additionally be provided by an electronic device integrated in a robotic or manual refueling station.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A fuel filler closure device for an automotive vehicle, comprising:
 a valve body adapted for mounting to a fuel filler pipe, with said valve body having a filler passage;
 an access door mounted within said valve body, with said access door having an open position allowing placement of a fuel nozzle within said filler passage, and a closed position for blocking insertion of a filler nozzle; and
 a locking mechanism for selectively permitting said access door to move from said closed position to said open position, with said locking mechanism comprising a remotely lockable plunger adapted for locking and unlocking in response to the proximity of an electronic device, wherein a refueling station comprises said electronic device.

2. A fuel filler closure device according to claim 1, wherein said valve body is generally cylindrical.

3. A fuel filler closure device according to claim 1, wherein said access door is mounted proximate an outer surface of the valve body, with said fuel filler closure device further comprising a sealed door underlying said access door.

4. A fuel filler closure device according to claim 3, wherein said access door is unsealed.

5. A fuel filler closure device according to Claim 1, wherein said access door is pivotably mounted to said valve body.

\* \* \* \* \*